United States Patent
Lee et al.

(10) Patent No.: US 8,868,239 B2
(45) Date of Patent: Oct. 21, 2014

(54) WALKING CONTROL APPARATUS OF ROBOT AND METHOD OF CONTROLLING THE SAME

(75) Inventors: Min Hyung Lee, Anyang-si (KR); Woong Kwon, Seongnam-si (KR); Kyung Shik Roh, Seongnam-si (KR); Joong Kyung Park, Suweon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 754 days.

(21) Appl. No.: 12/984,820

(22) Filed: Jan. 5, 2011

(65) Prior Publication Data

US 2011/0172825 A1    Jul. 14, 2011

(30) Foreign Application Priority Data

Jan. 12, 2010    (KR) ........................ 10-2010-0002581

(51) Int. Cl.
*G05B 15/00* (2006.01)
*B25J 9/16* (2006.01)
*G05B 19/00* (2006.01)

(52) U.S. Cl.
CPC ...................................... *B25J 9/161* (2013.01)
USPC ............................ 700/261; 700/245; 700/248

(58) Field of Classification Search
USPC .............................. 700/1, 245, 248, 250, 252
See application file for complete search history.

(56) References Cited

U.S. PATENT DOCUMENTS

| | | | | |
|---|---|---|---|---|
| 5,343,397 A | * | 8/1994 | Yoshino et al. ................. | 701/23 |
| 5,349,277 A | * | 9/1994 | Takahashi et al. ....... | 318/568.12 |
| 5,432,417 A | * | 7/1995 | Takenaka et al. ........ | 318/568.12 |
| 6,901,313 B2 | * | 5/2005 | Mori et al. ..................... | 700/245 |
| 6,920,374 B2 | * | 7/2005 | Takenaka et al. ............. | 700/245 |
| 7,379,789 B2 | * | 5/2008 | Takenaka et al. ............. | 700/245 |
| 2003/0114960 A1 | * | 6/2003 | Takenaka et al. ............. | 700/245 |
| 2003/0125839 A1 | * | 7/2003 | Takenaka et al. ............. | 700/245 |
| 2004/0128028 A1 | * | 7/2004 | Miyamoto et al. ............ | 700/245 |
| 2005/0038560 A1 | * | 2/2005 | Nagasaka ...................... | 700/245 |
| 2005/0240307 A1 | * | 10/2005 | Kuroki et al. .................. | 700/245 |
| 2006/0097683 A1 | * | 5/2006 | Hosoda et al. ........... | 318/568.12 |
| 2006/0173578 A1 | * | 8/2006 | Takenaka et al. ............. | 700/245 |
| 2006/0184276 A1 | * | 8/2006 | Takenaka et al. ............. | 700/245 |
| 2006/0247799 A1 | * | 11/2006 | Takenaka et al. ............... | 700/54 |
| 2006/0247800 A1 | * | 11/2006 | Takenaka et al. ............... | 700/54 |

* cited by examiner

*Primary Examiner* — Ian Jen

(74) *Attorney, Agent, or Firm* — Staas & Halsey LLP

(57) ABSTRACT

A walking control apparatus of a robot includes joint portions provided in each of a plurality of legs of the robot, a state database to store state data of each of the legs and state data of the joint portions corresponding to the state of each of the legs, when the robot walks, a position instruction unit to store desired positions corresponding to the state data of the joint portions, an inclination sensing unit to sense an inclination of an upper body of the robot, a torque calculator to calculate torques using the inclination of the upper body and the desired positions, and a servo controller to output the torques to the joint portions to control the walking of the robot. Since the robot walks by Finite State Machine (FSM) control and torque servo control, the rotation angles of the joint portions do not need to be accurately controlled. Thus, the robot walks with low servo gain and energy consumption is decreased. Since the robot walks with low servo gain, each of the joints has low rigidity and thus shock generated by collision with surroundings is decreased.

20 Claims, 8 Drawing Sheets

WALKING CONTROL APPARATUS OF ROBOT AND METHOD OF CONTROLLING THE SAME

CROSS-REFERENCE TO RELATED APPLICATION

This application claims the priority benefit of Korean Patent Application No. 10-2010-0002581, filed on Jan. 12, 2010 in the Korean Intellectual Property Office, the disclosure of which is incorporated herein by reference.

BACKGROUND

1. Field

Embodiments relate to a walking control apparatus of a robot which stably walks using a plurality of legs, and a method of controlling the same.

2. Description of the Related Art

A robot is a machine which has a joint structure similar to that of a human and performs the same operations as the hands and feet of a human using the joint structure.

Initially, industrial robots for automated and unmanned production tasks were developed. However, recently, a service robot to provide various services to a human has been actively developed.

Such a service robot mostly provides a service to a human while walking similar to a human. Accordingly, research into walking of the robot has been actively conducted.

Examples of a walking control method of a robot include a position-based Zero Moment Point (ZMP) control method (which follows a desired position of a robot joint), a torque-based dynamic walking control method (which follows desired torque of a robot joint), and a Finite State Machine (FSM) control method.

In the ZMP control method, a walking direction, a stride width, a walking rate and the like are determined in advance to satisfy a ZMP constraint, that is, a condition in which a ZMP is present in a safe area (which corresponds to the area of one foot in the case where the robot is supported by one foot or corresponds to a small area which is set in consideration of safety in a convex polygon including the areas of two feet in the case where the robot is supported by two feet) of a stance polygon formed by stances of legs of the robot, the walking pattern of each leg corresponding to the determination is generated, and the walking trajectory of each leg is calculated according to the walking pattern.

The position of the joint of each leg is calculated by inverse Kinematic calculation of the calculated walking trajectory, and a desired control value of each joint is calculated based on the current angle and the desired angle of each joint.

The torque-based dynamic walking control method is implemented by servo control to enable each leg to follow the calculated walking trajectory during every control time period. That is, it is detected whether the position of each leg accurately follows the walking trajectory according to the walking pattern while walking. When each leg deviates from the walking trajectory, the torque of the motor is controlled such that each leg accurately follows the walking trajectory.

In the FSM control method, the robot does not walk to follow the position during every control time period, operation states of the walking robot are set in advance, desired torques of joints are calculated by referring to the operation states (indicating the states of the FSM) while walking, and the robot walks to follow the desired torques of the joints.

In the FSM control method, the robot adopts various poses by changing the operation state while walking. However, since each pose is adopted in a restricted operation state, a separate operation to maintain balance of the robot is performed regardless of a walking operation to perform a task.

Since the ZMP control method is the position-based control method, accurate position control is possible, but high servo gain is necessary because accurate angle control of each joint is performed. Accordingly, since high current is necessary, energy efficiency is low and joint rigidity is high, thereby applying considerable shock to walking surfaces.

In order to calculate the angle of each joint from the walking pattern of the foot and a given Center Of Gravity (COG) through inverse kinematics, Kinematic Singularity needs to be avoided. Thus, the robot always bends its knees while walking. Thus, the robot may unnaturally walk unlike a human.

In the torque-based dynamic walking control method, a dynamic equation needs to be solved for stable walking. However, since the dynamic equation of a robot having legs with six degrees of freedom to implement a certain direction in a space is very complicated, such a method has been applied to a robot having legs with four degrees of freedom.

In the FSM control method, since control is performed by a torque command and an elasticity mechanism is applied, energy efficiency is high and rigidity is low, thereby providing safety to surroundings. However, since it is difficult to perform accurate position control, it is difficult to perform accurate whole-body motion such as ascending of stairs or avoidance of an obstacle.

SUMMARY

Therefore, it is an aspect to provide a walking control apparatus of a robot to maintain stable walking of the robot, and a method of controlling the same.

It is another aspect to provide a walking control apparatus of a robot to improve walking efficiency and performance of the robot, and a method of controlling the same.

Additional aspects will be set forth in part in the description which follows and, in part, will be obvious from the description, or may be learned by practice of the invention.

In accordance with one aspect, there is provided a walking control apparatus of a robot including: joint portions provided in each of a plurality of legs of the robot; a state database to store state data of each of the legs and state data of the joint portions corresponding to the state of each of the legs, when the robot walks; a position instruction unit to store desired positions corresponding to the state data of the joint portions; an inclination sensing unit to sense an inclination of an upper body of the robot; a torque calculator to calculate torques using the inclination of the upper body and the desired positions; and a servo controller to output the torques to the joint portions to control the walking of the robot.

The walking control apparatus may further include a compensator to calculate compensation angles of a current state using the inclination of the upper body, and the position instruction unit may compare positions of a current state with desired positions of a next state to generate position instructions of the joint portions, compensate for the position instructions of the joint portions using the compensation angles of the current state, and regenerate and output the position instructions to the torque calculator.

The walking control apparatus may further include a compensator to calculate compensation angles using the inclination of the upper body, and the torque calculator may calculate the torques using the desired positions and the compensation angles if the position instruction unit transmits desired position instruction signals of a next state.

The inclination sensing unit may sense a pitch angle and a roll angle of the upper body, and the compensator may calculate a pitch compensation angle using the pitch angle of the upper body and calculate a roll compensation angle using the roll angle of the upper body.

The joint portions may include a hip joint portion to move a thighbone portion of the robot and an ankle joint portion to move a foot.

The torque calculator may analyze the pitch angle and the roll angle of the upper body and determine a direction of the pitch angle and a direction of the roll angle.

The torque calculator may compare the pitch angle of the upper body with a first reference pitch angle and a second reference pitch angle to calculate the pitch torque of any one of the ankle joint portion or the hip joint portion, if the pitch angle of the upper body is a pitch angle of a forward direction.

The torque calculator may compare the pitch angle of the upper body with a third reference pitch angle and a fourth reference pitch angle to calculate the pitch torque of any one of the ankle joint portion or the hip joint portion, if the pitch angle of the upper body is a pitch angle of a backward direction.

The torque calculator may compare the roll angle of the upper body with a first reference roll angle and a second reference roll angle to calculate the roll torque of any one of the ankle joint portion or the hip joint portion, if the roll angle of the upper body is a roll angle of a right direction.

The torque calculator may compare the roll angle of the upper body with a third reference roll angle and a fourth reference roll angle to calculate the roll torque of any one of the ankle joint portion or the hip joint portion, if the roll angle of the upper body is a roll angle of a left direction.

In accordance with another aspect, there is provided a walking control method of a robot including: outputting instructions of desired positions corresponding to state data of joint portions provided in the robot when the robot walks; sensing an inclination of an upper body of the robot; calculating torques using the desired positions and the inclination of the upper body; and outputting the calculated torques to the joint portions to control the walking of the robot.

The calculating of the torques may include selecting the desired positions in a position trajectory, calculating compensation angles corresponding to the inclination of the upper body, and compensating for the desired positions using the compensation angles to calculate the torques.

The sensing of the inclination of the upper body of the robot may include sensing a pitch angle and a roll angle of the upper body.

The calculating of the compensation angles may include calculating a pitch compensation angle and a roll compensation angle.

The outputting of the calculated torques to the joint portions may include outputting the torques to at least one of a hip joint portion to move a thighbone portion of the robot and an ankle joint portion to move a foot of the robot.

The walking control method may further include determining a direction of the pitch angle of the upper body and a direction of the roll angle of the upper body.

The calculating of the torques may include comparing the pitch angle of the upper body with a first reference pitch angle and a second reference pitch angle if the pitch angle of the upper body is a pitch angle of a forward direction, calculating pitch torque of the ankle joint portion using the pitch compensation angle if the pitch angle of the upper body exceeds the first reference pitch angle and is equal to or less than the second reference pitch angle, and calculating the pitch torque of the hip joint portion using the pitch compensation angle if the pitch angle of the upper body exceeds the second reference pitch angle.

The calculating of the torques may include comparing the pitch angle of the upper body with a third reference pitch angle and a fourth reference pitch angle if the pitch angle of the upper body is a pitch angle of a backward direction, calculating pitch torque of the ankle joint portion using the pitch compensation angle if the pitch angle of the upper body exceeds the third reference pitch angle and is equal to or less than the fourth reference pitch angle, and calculating the pitch torque of the hip joint portion using the pitch compensation angle if the pitch angle of the upper body exceeds the fourth reference pitch angle.

The calculating of the torques may include comparing the roll angle of the upper body with a first reference roll angle and a second reference roll angle if the roll angle of the upper body is a roll angle of a right direction, calculating roll torque of the ankle joint portion using the roll compensation angle if the roll angle of the upper body exceeds the first reference roll angle and is equal to or less than the second reference roll angle, and calculating the roll torque of the hip joint portion using the roll compensation angle if the roll angle of the upper body exceeds the second reference roll angle.

The calculating of the torques may include comparing the roll angle of the upper body with a third reference roll angle and a fourth reference roll angle if the roll angle of the upper body is a roll angle of a left direction, calculating roll torque of the ankle joint portion using the roll compensation angle if the roll angle of the upper body exceeds the third reference roll angle and is equal to or less than the fourth reference roll angle, and calculating the roll torque of the hip joint portion using the roll compensation angle if the roll angle of the upper body exceeds the fourth reference roll angle.

The outputting of the instructions of the desired positions may include comparing desired positions of a next state and positions of a current state of the joint portions to generate position instruction signals and outputting the generated position instruction signals.

The calculating of the torques may include compensating for the generated position instruction signals using the inclination of the upper body, and calculating the torques to follow the compensated position instruction signals.

According to the embodiments, since the robot walks by Finite State Machine (FSM) control and torque servo control, the rotation angles of the joint portions do not need to be accurately controlled. Thus, the robot walks with low servo gain and energy consumption is decreased.

Since the robot walks with low servo gain, each of the joints has low rigidity and thus shock generated by collision with surroundings is decreased.

Since the robot walks while extending its knee, the robot walks similar to a human. A human-friendly robot is implemented and energy necessary for bending the knee of the robot is conserved.

Since calculation of the compensation angle corresponding to the inclination of the upper body of the robot is simple, a robot having joints with six degrees of freedom stably walks, and walking efficiency and performance of the robot is improved.

BRIEF DESCRIPTION OF THE DRAWINGS

These and/or other embodiments will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings.

Figure 1:
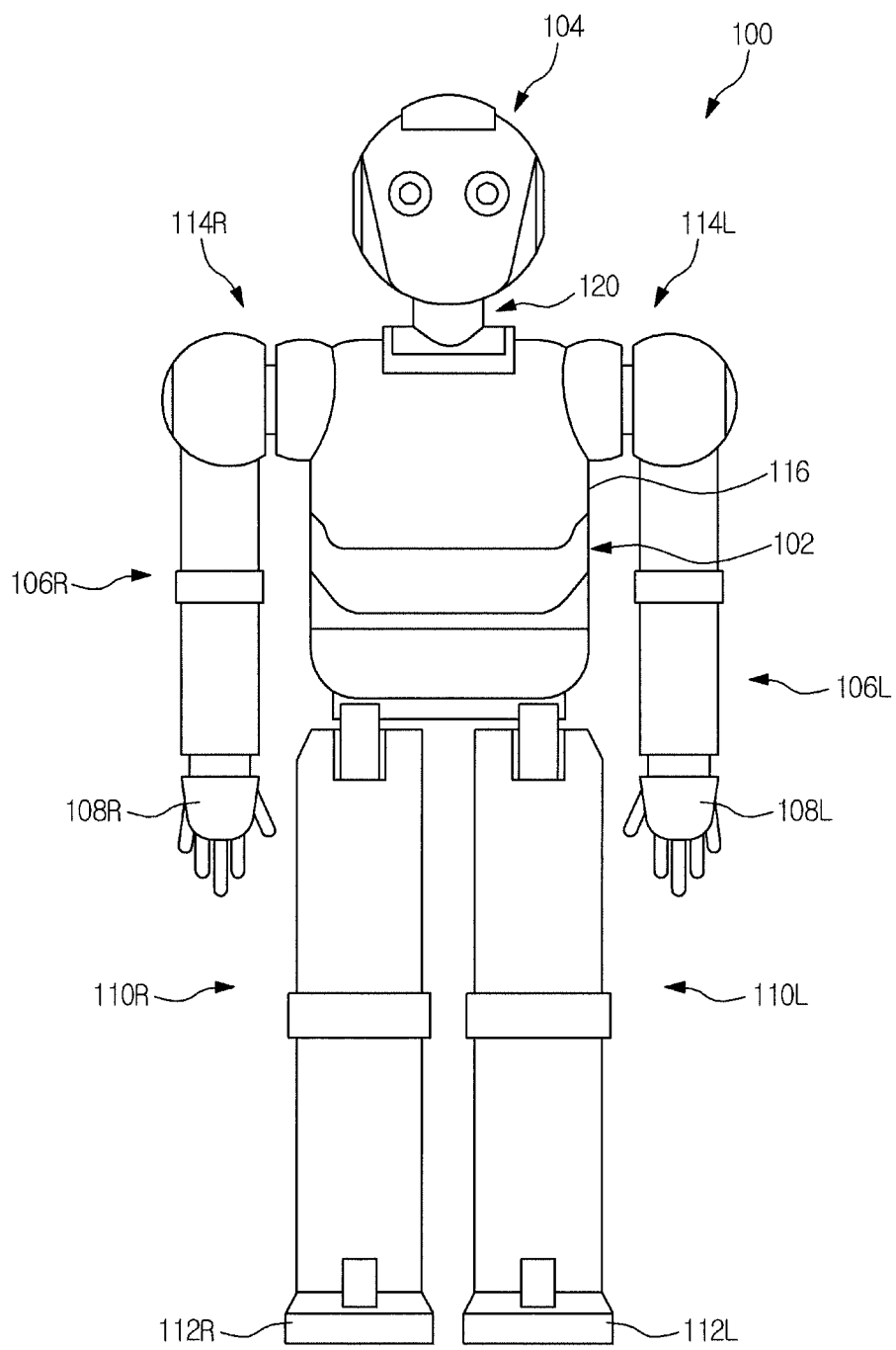
FIG. 1 illustrates a robot according to an embodiment.
Figure 2:
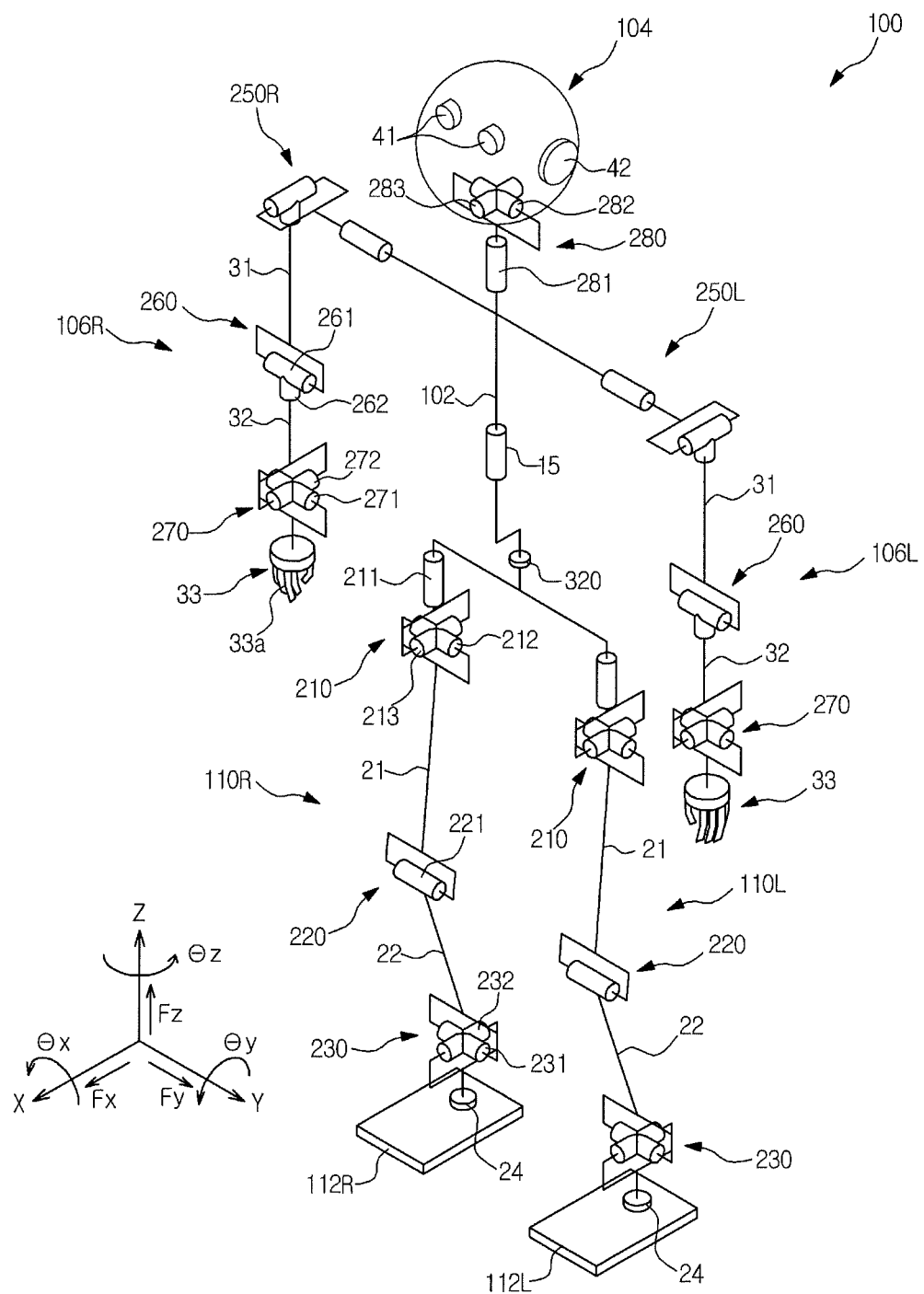
FIG. 2 illustrates a joint structure of a robot according to an embodiment.

FIG. 1 is a diagram showing a robot according to an embodiment, and FIG. 2 is a diagram showing a joint structure of a robot according to an embodiment.

As shown in FIG. 1, the robot 100 may include an upper body including a head, a torso and arms and a lower body including a plurality of legs.

More particularly, the upper body of the robot 100 includes the torso 102, the head 104 connected to an upper portion of the torso 102 through a neck 120, two arms 106L and 106R connected to both sides of the upper portion of the torso 102 through shoulders 114L and 114R, and hands 108L and 108R connected to respective ends of the two arms 106L and 106R.

The lower body of the robot 100 includes two legs 110L and 110R connected to both sides of a lower portion of the torso 102 of the upper body and feet 112L and 112R connected to respective ends of the two legs 110L and 110R.

Each of the head 104, the two arms 106L and 106R, the two legs 110L and 110R, the two hands 108L and 108R and the two feet 112L and 112R has a predetermined degree of freedom through respective joints.

The inside of the torso 102 of the upper body is protected by a cover 116. In reference numerals, "R" and "L" denote the right and left of the robot 100, respectively.

As shown in FIG. 2, each of the two legs 110L and 110R of the robot 100 has a thighbone portion 21, a fibula portion 22 and the feet 112L and 112R.

The thighbone portion 21 is connected to the torso 102 of the upper body through a hip joint portion 210, the thighbone portion 21 and the fibula portion 22 are connected to each other through a knee joint portion 220, and the fibula portion 22 and the foot 112L or 112R are connected to each other through an ankle joint portion 230.

The hip joint portion 210 may have three degrees of freedom. More particularly, the hip joint portion 210 includes a rotation joint 211 of a yaw direction (Z-axis rotation), a rotation joint 212 of a pitch direction (Y-axis rotation) and a rotation joint 213 of a roll direction (X-axis rotation).

The knee joint portion 220 includes a rotation joint 221 of a pitch direction and may have one degree of freedom.

The ankle joint portion 230 includes a rotation joint 231 of a pitch direction and a rotation joint 232 of a roll direction and may have two degrees of freedom.

Since each of the two legs 110L and 110R may include six rotation joints with respect to three joint portions 210, 220 and 230, the two legs 110L and 110R include a total of 12 rotation joints.

A multi-axis Force and Torque (F/T) sensor 24 is provided between the foot 112L or 112R and the ankle joint portion 230 of each of the two legs 110L and 110R. The multi-axis F/T sensor 24 measures three-directional components Fx, Fy and Fz of force transferred from the foot 112L or 112R and three-directional components Mx, My and Mz of moment to detect landing of the foot 112L or 112R and weight applied to the foot 112L or 112R.

Cameras 41 to photograph surroundings and a microphone 42 to receive user voice are provided in the head 104.

The head 104 is connected to the torso 102 of the upper body through a neck joint portion 280. The neck joint portion 280 includes a rotation joint 281 of a yaw direction, a rotation joint 282 of a pitch direction and a rotation joint 283 of a roll direction and may have three degrees of freedom.

Head rotation motors (not shown) are connected to the rotation joints 281, 282 and 283 of the neck joint portion 280.

The shoulder joint portions 250L and 250R are mounted on both sides of the torso 102 of the upper body to connect the two arms 106L and 106R to the torso 102 of the upper body.

Each of the two arms 106L and 106R has a humerus portion 31, a forearm bone portion 32 and a hand 33.

More particularly, the humerus portion 31 is connected to the upper body 102 through the should joint portion 250L or 250R, the humerus portion 31 and the forearm bone portion 32 are connected to each other through an elbow joint portion 260, and the forearm bone portion 32 and the hand 33 are connected to each other through a wrist joint portion 270.

The elbow joint portion 260 includes a rotation joint 261 of a pitch direction and a rotation joint 262 of a yaw direction and has two degrees of freedom. The wrist joint portion 270 includes a rotation joint 271 of a pitch direction and a rotation joint 272 of a roll direction and has two degrees of freedom.

The hand 33 includes five fingers 33a. A plurality of joints (not shown) driven by motors may be provided in the hand 33. The five fingers 33a perform various operations such as grasping of an object or indication of a specific direction in interlock with motion of the arm 106.

A rotation joint 15 of a yaw direction is provided in the torso 102 of the upper body such that the upper body rotates.

An inclination sensing unit 320 is provided in the torso 102 of the upper body to sense an inclination angle, which is an inclination of the upper body relative to a vertical axis, and an angular speed thereof.

That is, the inclination sensing unit 320 senses rotation of the upper body of the robot in three axes, that is, pitch, roll and yaw axes and the angular speed thereof.

As the inclination sensing unit 320, an Inertial Measurement Unit (IMU) may be used.

Although not shown, actuators such as motors to drive the rotation joints are provided in the robot 100. A controller to control the overall operation of the robot 100 adequately controls the motors to perform various operations of the robot 100.

Figure 3:
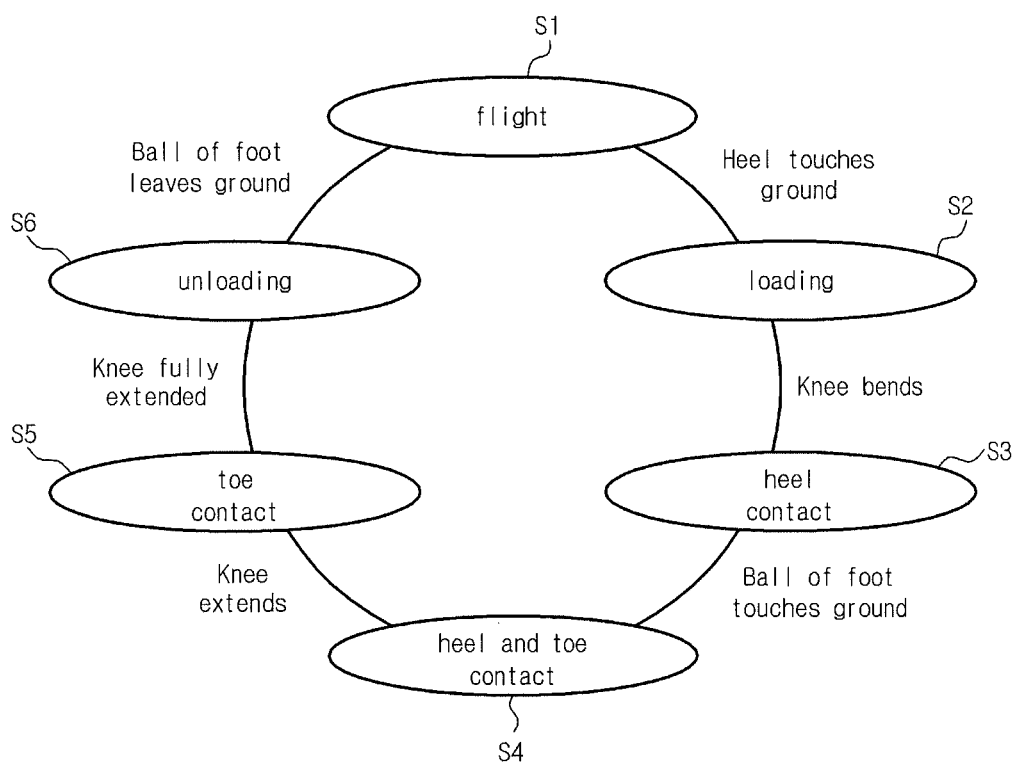
FIG. 3 illustrates the state of a leg when a robot walks according to an embodiment.

FIG. 3 is a diagram showing the states of a leg of a robot and the state control operations in a walking control apparatus of the robot according to the embodiment based on a Finite State Machine (FSM).

In the diagram showing the operation of one leg while walking, a first operation state S1 (flight) denotes a pose in which one leg swings, a second operation state S2 (loading) denotes a pose in which one foot is put down on the ground, a third operation state S3 (heel contact) denotes a pose in which the heel of one foot touches the ground, a fourth operation state S4 (heel and toe contact) denotes a pose in which the heel and the toe of one foot simultaneously touch the ground, a fifth state S5 (toe contact) denotes a pose in which the toe of one foot touches the ground, and a six operation state S6 (unloading) denotes a pose in which one foot is taken off the ground.

In order to switch one operation state to another operation state, a control action to switch the operation state is necessary. If the first operation state S1 is switched to the second operation state S2 (S1→S2), a control operation (heel touches the ground) to enable the heel of the foot to touch the ground is necessary. If the second operation state S2 is switched to the third operation state S3 (S2→S3), a control operation (knee bends) to bend the knee of the foot which touches the ground is necessary. If the third operation state S3 is switched to the fourth operation state S4 (S3→S4), a control operation (ball of foot touches the ground) to enable the toe of the foot to touch the ground is necessary. If the fourth operation state S4 is switched to the fifth operation state S5 (S4→S5), a control operation (knee extends) to extend the knee of the foot which touches the ground is necessary. If the fifth operation state S5 is switched to the sixth operation state S6 (S5→S6), a control operation (knee fully extended) to fully extend the knee of the foot which touches the ground is necessary. If the sixth operation state S6 is switched to the first operation state S1 (S6→S1), a control operation (ball of foot leaves the ground) to take the toe of the foot off the ground is necessary.

The state data of each leg has state data of the plurality of joint portions provided in each leg.

The torques of the joint portions to follow the states of the two legs are calculated in order to enable the robot to execute a control action to switch the states of the legs and the joint portions, and the calculated torques are output to the actuators, such as the motors, provided in the joint portions to drive the actuators.

Such a robot may not maintain balance according to the inclination of the upper body and may not walk naturally, when the support states of the left leg and the right leg are switched and the states of the joint portions are switched.

Therefore, before the states of the joint portions are switched, the inclination of the upper body is determined, a compensation angle corresponding to the inclination of the upper body of the robot is calculated, and a next state is compensated for using the compensation angle. That is, when torque to follow the next state is calculated, the compensation angle is applied to follow the next state to which the compensation angle is applied. Accordingly, the robot may stably and naturally walk while maintaining balance. This will be described in detail with reference to FIG. 4.

Figure 4:
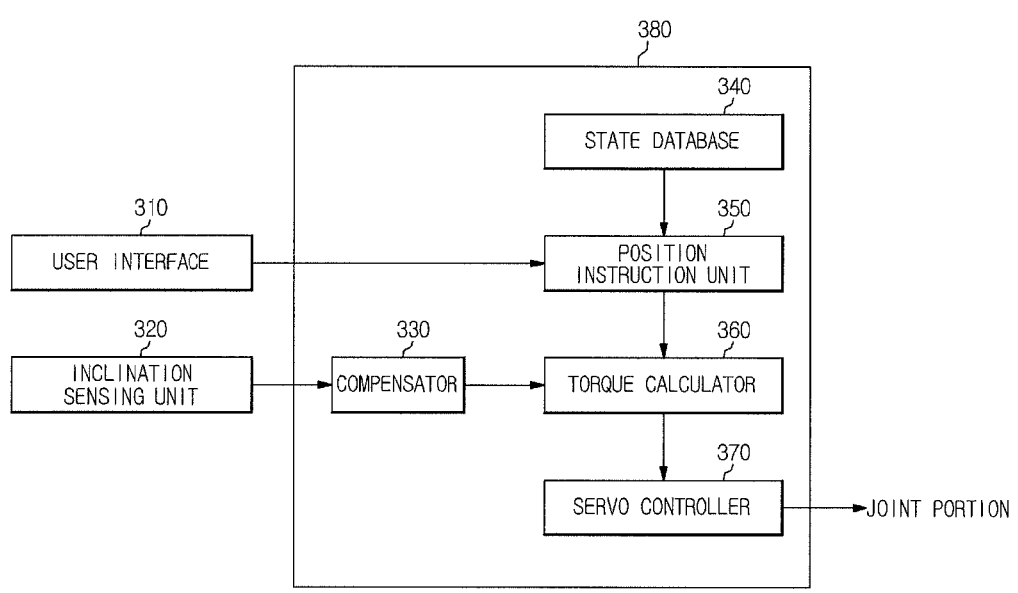
FIG. 4 illustrates the configuration of a walking control apparatus of a robot according to an embodiment.

FIG. 4 illustrates the configuration of a walking control apparatus of a robot according to an embodiment. The walking control apparatus of the robot includes a user interface 310, an inclination sensing unit 320, and a walking controller 380.

The user interface 310 receives a user command to instruct the walking of the robot and transmits a signal corresponding to the user command to the walking controller 380.

The inclination sensing unit 320 is provided in the torso 102 of the upper body of the robot to sense and transmit the state of the upper body of the robot to a compensator 330 and a torque calculator 360. The state of the upper body of the robot includes the inclination angle, which is the inclination of the upper body relative to the vertical axis, and the angular speed thereof.

That is, the inclination sensing unit 320 may sense the rotation angle of the upper body relative to three axes, that is, the roll (θx), pitch (θy) and yaw (θz) axes, and the angular speed thereof. As the inclination sensing unit 320, an inertial measurement unit (IMU) may be used.

The inclination sensing unit 320 senses the pitch angle $\theta_p$ and the roll angle $\theta_r$ of the upper body corresponding to the inclination of the upper body of the robot and transmits the pitch angle $\theta_p$ and the roll angle $\theta_r$ of the upper body to the compensator 330 and the torque calculator 360.

The inclination sensing unit 320 may further transmit the angular speed $d\theta_p/dt$ of the pitch angle $\theta_p$ and the angular speed $d\theta_r/dt$ of the roll angle $\theta_r$ of the upper body.

Alternatively, the compensator 330 may calculate the angular speed $d\theta_p/dt$ of the pitch angle $\theta_p$ and the angular speed $d\theta_r/dt$ of the roll angle $\theta_r$ of the upper body, by differentiating the pitch angle $\theta_p$ and the roll angle $\theta_r$ of the upper body.

The walking controller 380 (330, 340, 350, 360 and 370) controls the driving of the actuators, such as the motors, provided in the joint portions 210, 220 and 230 when a walking instruction is transmitted from the user interface 310.

The walking controller 380 controls the walking of the robot based on the user command input through the user interface 310 and the data supplied from the inclination sensing unit 320.

The walking controller 380 include the compensator 330, a state database 340, a position instruction unit 350, a torque calculator 360 and a servo controller 370, which will now be described in detail.

The compensator 330 calculates a pitch compensation angle $\theta_{pc}$ using the pitch angle $\theta_p$ and the pitch angular speed $d\theta_p/dt$ of the upper body transmitted from the inclination sensing unit 320, calculates a roll compensation angle $\theta_{rc}$ using the roll angle $\theta_r$ and the roll angular speed $d\theta_r/dt$ of the upper body, and transmits them to the torque calculator 360.

The pitch angular speed $d\theta_p/dt$ of the upper body may be calculated by differentiating the pitch angle $\theta_p$ of the upper body and the roll angular speed $d\theta_r/dt$ may be calculated by differentiating the roll angle $\theta_r$.

The compensator 330 calculates the pitch compensation angle $\theta_{pc}$ and the roll compensation angle $\theta_{rc}$ using Proportional-Derivative (PD) control as follows.

$$\theta_{pc}=k_{p1}(\theta_{dp}-\theta_p)+k_{d1}(d\theta_{dp}/dt-d\theta_p/dt) \qquad \text{Equation 1}$$

$$\theta_{rc}=k_{p2}(\theta_{dr}-\theta_r)+k_{d2}(d\theta_{dr}/dt-d\theta_r/dt) \qquad \text{Equation 2}$$

where, $k_{p1}$ and $k_{p2}$ denote P gains of PD control, $k_{d1}$ and $k_{d2}$ denote D gains of PD control, $\theta_{dp}$ denotes a desired pitch angle of the upper body, $\theta_p$ denotes the sensed pitch angle of the upper body, $\theta_{dr}$ denotes a desired roll angle of the upper body, and $\theta_r$ denotes the sensed roll angle of the upper body.

The gains $k_{p1}$, $k_{d1}$, $k_{p2}$, and $k_{d2}$ of PD control are determined through repeated experimentation to optimize walking stability.

The state database 340 stores state data of the left leg and the right leg while walking and state data of the plurality of joint portions corresponding to the states of the legs.

The state database 340 stores the state data of the two legs and the joint portions based on Finite State Machine (FSM).

The FSM sequentially represents the restricted state changes of the two legs.

The states of the two legs while walking are determined depending on which foot is in a support state and which is in a swing state. When the two feet land on the ground, the support state and the swing state of each foot are switched based on a landing signal sensed by a force/torque sensor (not shown) of the ankle.

The position instruction unit 350 generates desired positions θ corresponding to the state data of the legs and the state data of the plurality of joint portions provided in the legs stored in the state database 340 and generates a position trajectory obtained by fitting a curved line to the desired positions.

The position instruction unit 350 compares a desired position of a next state and a position of a current state to calculate a positional error and transmits the positional error to the torque calculator 360 as a position instruction to perform the next state.

The position is the rotation angle θ of each joint position corresponding to the state of the leg and the position trajectory is a change in rotation angle with time, which is expressed by a curved line.

The position instruction unit 350 may output an instruction signal obtained by compensating for the position instruction of the next state using the compensation angle as a desired position instruction signal of the next state. At this time, the torque calculator 360 may calculate torque to follow the desired position instruction signal transmitted from the position instruction unit.

The torque calculator 360 selects an operation of the next state of the robot based on the state data of the legs and the joint portions stored in the state database 340 and the position trajectory stored in the position instruction unit 350, determines a desired position to which the robot is moved in correspondence with the operation, and calculates torque necessary for driving the joint portions in order to follow the desired position.

The torque calculator 360 uses PD control when calculating the torques applied to the joint portions, and a torque calculation equation is expressed as follows.

$$T_p = k_{p3}(\theta_d - \theta_c) + k_{d3}(d\theta_d/dt - d\theta_c/dt) \quad \text{Equation 3}$$

$$T_r = k_{p3}(\theta_c - \theta_c) + k_{d3}(d\theta_d/dt - d\theta_c/dt) \quad \text{Equation 4}$$

where, $k_{p3}$ denotes P gain of PD control, $k_{d3}$ denotes D gain of PD control, $\theta_d$ denotes a desired position of the next state of the joint portion, and $\theta_c$ denotes the position of the current state of the joint portion. The P and D gains enable the robot to stably walk and are acquired through experimentation.

The torque calculator 360 changes the torque calculation equation to calculate the torque applied to the ankle joint portion 230 to move the feet 112L and 112R and the hip joint portion 210 to move the thighbone portion 21 of the robot according to the pitch angle and the roll angle of the upper body for stable walking. This will now be described in detail.

The torque calculator 360 calculates the torques applied to the joint portions 210 and 230 using Equations 3 and 4 without applying the compensation angle to the torque calculation equation, if the pitch compensation angle is a stable angle ($\theta_p \leq a1$ or $\theta_p \leq a3$) and the roll compensation angle is a stable angle ($\theta_r \leq b1$ or $\theta_r \leq b3$).

The torque calculator 360 calculates the pitch torque and the roll torque by applying the pitch compensation angle and the roll compensation angle to the torque calculation equation to calculate the torques applied to the joint portions 210 and 230 if at least one of the pitch compensation angle and the roll compensation angle is not the stable angle ($\theta_p > a1$ or $\theta_p > a3$ or $\theta_r > b1$ or $\theta_r > b3$).

At this time, the torque calculator 360 uses PD control when calculating the torques applied to the joint portions.

$$T_p = k_{p3}(\theta_d - \theta_c \pm \theta_{pc}) + k_{d3}(d\theta_d/dt - d\theta_c/dt \pm \theta_{pc}/dt) \quad \text{Equation 5}$$

$$T_r = k_{p3}(\theta_d - \theta_c \pm \theta_{rc}) + k_{d3}(d\theta_d/dt - d\theta_c/dt \pm \theta_{rc}/dt)$$

where, the sign ± of the compensation angle and the angular speed applied to the torque calculation equation becomes + if the upper body is inclined in the same direction as the walking direction of the robot and becomes − if the upper body is inclined in the direction opposite to the walking direction of the robot or becomes + if the upper body is inclined in the same lateral direction of the swing foot in the left and right direction of the swing foot and becomes − if the upper body is inclined in the lateral direction opposite to the direction of the swing foot.

The torque is rotation force to be applied to the joint portion in order to follow the position trajectory. At this time, the position trajectory is stably adjusted by applying the compensation angle when calculating the torque.

The torque calculator 360 analyzes the pitch angle and the roll angle of the upper body transmitted from the inclination sensing unit 320, and determines whether the pitch angle is a pitch angle of a forward direction or a pitch angle of a backward direction and whether the roll angle is a roll angle of a right direction or a roll angle of a left angle.

At this time, the directions of the pitch angle and the roll angle are determined according to the coordinates of the inclination of the upper body, that is, the signs of the X axis and the Y axis.

By referring to the coordinate axis of FIG. 2, it is determined that the upper body is inclined in a forward direction if the coordinate sign of the X axis is +, it is determined that the upper body is inclined in a backward direction if the coordinate sign of the X axis is −, it is determined that the upper body is inclined in a right direction if the coordinate sign of the Y axis is +, and it is determined that the upper body is inclined in a left direction if the coordinate sign of the Y axis is −.

If the pitch angle of the upper body is the pitch angle of the forward direction, the torque calculator 360 compares the pitch angle of the upper body with a first reference pitch angle a1 and a second reference pitch angle a2 and applies the pitch compensation angle to the pitch torque calculation equation of any one of the ankle joint portion 230 or the hip joint portion 210 according to the compared result, thereby calculating the pitch torque.

If the pitch angle of the upper body is the pitch angle of the backward direction, the torque calculator 360 compares the pitch angle of the upper body with a third reference pitch angle a3 and a fourth reference pitch angle a4 and applies the pitch compensation angle to the pitch torque calculation equation of any one of the ankle joint portion 230 or the hip joint portion 210 according to the compared result, thereby calculating the pitch torque.

The first reference pitch angle a1, the second reference pitch angle a2, the third reference pitch angle a3 and the fourth reference pitch angle a4 are set in advance.

Figure 5:
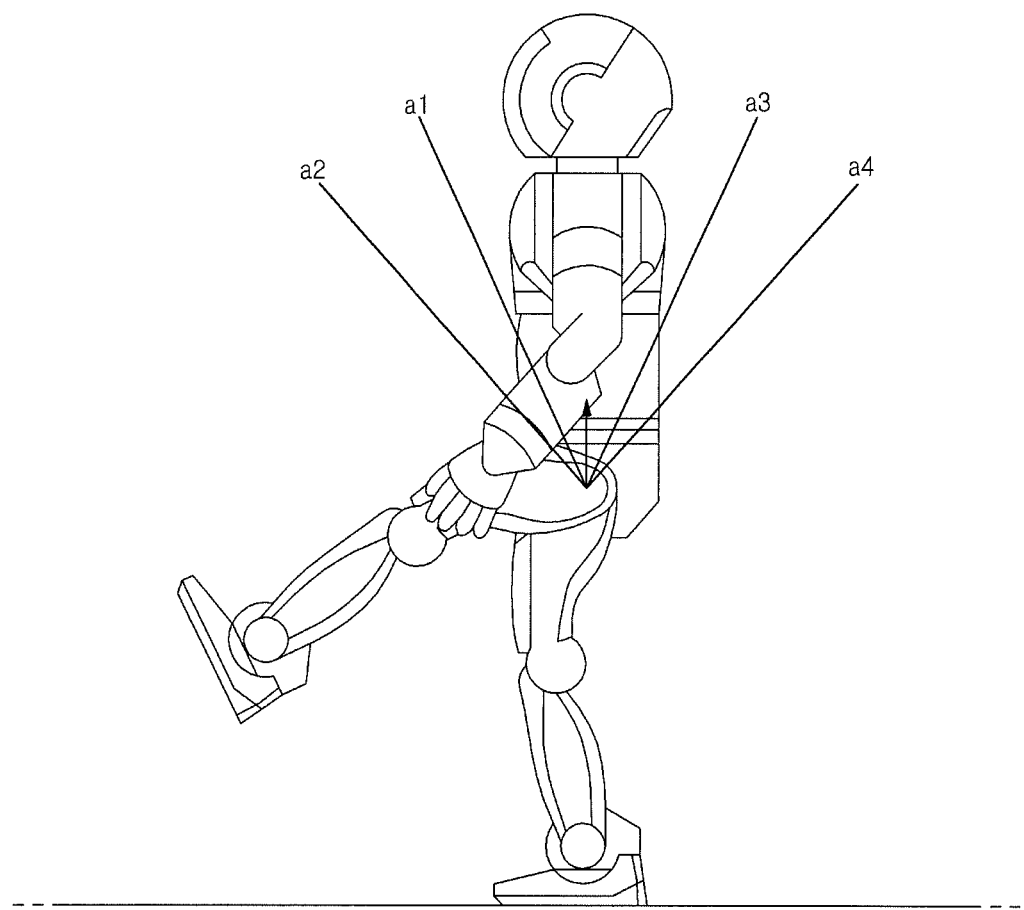
FIGS. 5 and 6 illustrates walking of a robot according to an embodiment.

As shown in FIG. 5, the first reference pitch angle a1 and the second reference pitch angle a2 are the pitch angles of the forward direction and the third reference pitch angle a3 and the fourth reference pitch angle a4 are the pitch angles of the backward direction, all of which are reference angles to determine a pitch angle control object (hip joint portion or knee joint portion).

An angle between a vertical axis of the ground and the first reference pitch angle a1 is less than an angle between the vertical axis of the ground and the second reference pitch angle a2, and an angle between the vertical axis of the ground and the third reference pitch angle a3 is less than an angle between the vertical axis of the ground and the fourth reference pitch angle a4.

If the roll angle of the upper body is the roll angle of the right direction, the torque calculator 360 compares the roll angle of the upper body with a first reference roll angle b1 and a second reference roll angle b2 and applies the roll compensation angle to the roll torque calculation equation of any one of the ankle joint portion 230 or the hip joint portion 210 according to the compared result, thereby calculating the roll torque.

If the roll angle of the upper body is the roll angle of the left direction, the torque calculator 360 compares the roll angle of the upper body with a third reference roll angle b3 and a fourth reference roll angle b4 and applies the roll compensation angle to the roll torque calculation equation of any one of the ankle joint portion 230 or the hip joint portion 210 according to the compared result, thereby calculating the roll torque.

The first reference roll angle b1, the second reference roll angle b2, the third reference roll angle b3 and the fourth reference roll angle b4 are set in advance.

Figure 6:
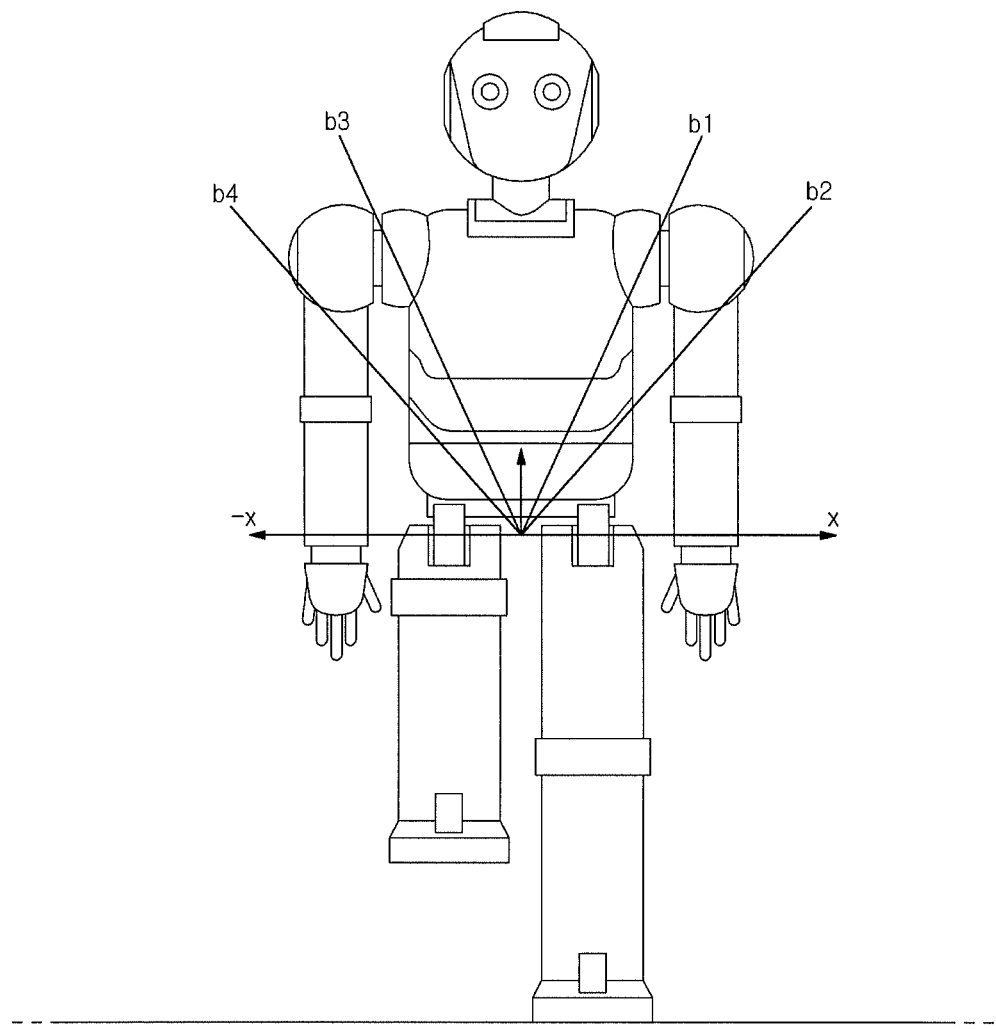

As shown in FIG. 6, the first reference roll angle b1 and the second reference roll angle b2 are the roll angles of the right direction and the third reference roll angle b3 and the fourth reference roll angle b4 are the roll angles of the left direction, all of which are reference angles to determine a roll angle control object (hip joint portion or knee joint portion).

An angle between the vertical axis of the ground and the first reference roll angle b1 is less than an angle between the vertical axis of the ground and the second reference roll angle b2 and an angle between the vertical axis of the ground and the third reference roll angle b3 is less than an angle between the vertical axis of the ground and the fourth reference roll angle b4.

At this time, the absolute values of the first reference roll angle b1 and the third reference roll angle b3 are equal to each other and the signs thereof are opposite to each other, and the absolute values of the second reference roll angle b2 and the fourth reference roll angle b4 are equal to each other and the signs thereof are opposite to each other.

That is, the torque calculator 360 applies the pitch compensation angle to the torque calculation equation of the hip joint portion 210 to calculate the pitch torque to be applied to the hip joint portion 210, if the upper body is largely inclined forward or backward (a2<$\theta_p$ or a4<$\theta_p$), and applies the roll compensation angle to the torque calculation equation of the hip joint portion 210 to calculate the roll torque to be applied to the hip joint portion 210, if the upper body is largely inclined laterally (b2<$\theta_r$ or b4<$\theta_r$).

In contrast, the torque calculator 360 applies the pitch compensation angle to the torque calculation equation of the ankle joint portion 230 to calculate the pitch torque to be applied to the ankle joint portion 230, if the upper body is slightly inclined forward or backward (a1<$\theta_p$≤a2 or a3<$\theta_p$≤a4), and applies the roll compensation angle to the torque calculation equation of the ankle joint portion 230 to calculate the roll torque to be applied to the ankle joint portion 230, if the upper body is slightly inclined laterally (b1<$\theta_r$≤b2 or b3<$\theta_r$≤b4).

The servo controller 370 controls and outputs Pulse-Width Modulation (PWM) signals corresponding to the torques calculated by the torque calculator 360 to the joint portions 210 and 230.

The pitch angle or the roll angle of the joint portion is compensated for and the position trajectory is adjusted such that the robot stably walks.

An impedance controller to output a signal to perform impedance control (rigidity control) of each joint portion according to the state of each joint portion may be further included.

Figure 7:
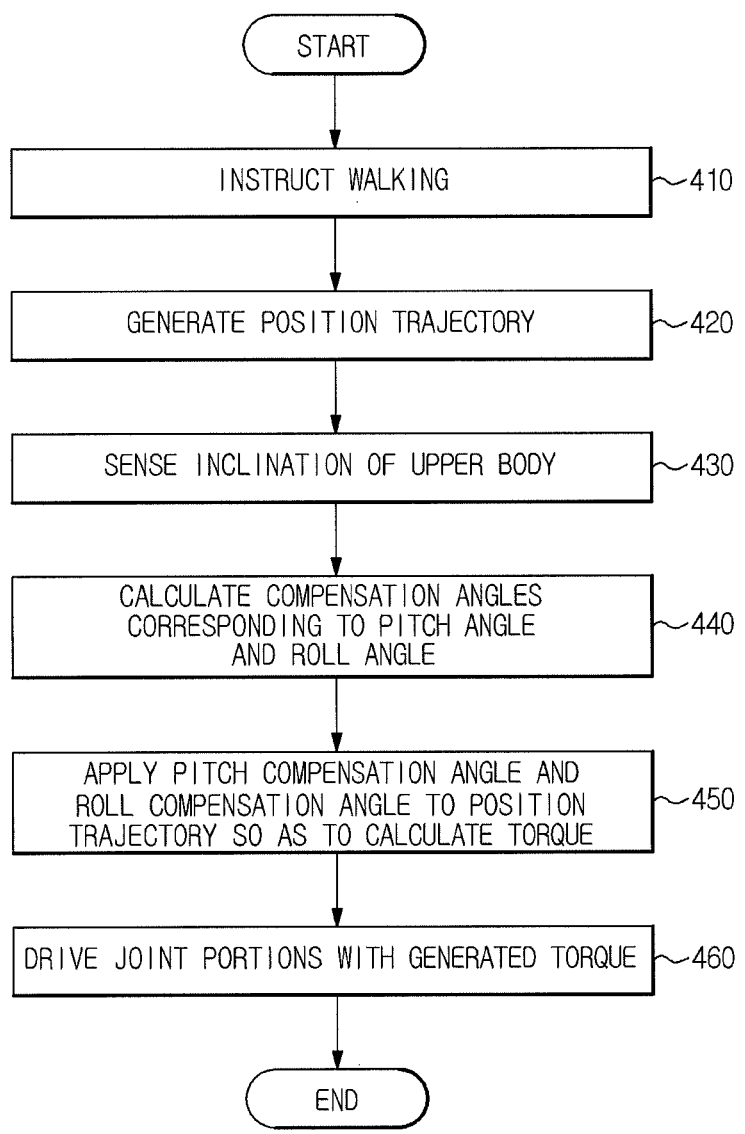
FIG. 7 illustrates a walking control method of a robot according to an embodiment.

FIG. 7 illustrates a walking control method of a robot according to an embodiment, which will be described with reference to FIGS. 1 to 6.

It is determined whether the user command to instruct the walking of the robot is input through the user interface 310. If it is determined that the walking of the robot is instructed (410), the state data of the two legs and the state data of the joint portions are extracted from the state database 340, the desired positions corresponding to the extracted state data are generated, and the position trajectory obtained by connecting the desired positions is generated (420). The desired positions corresponding to the state data of the joint portions are set in advance.

The position trajectory represents the rotation angles of the joint portions 210, 220 and 230 to follow the states of the legs over time.

Next, the inclination of the upper body of the robot is sensed (430). At this time, the state of the upper body of the robot includes the inclination angle, which is the inclination of the upper body relative to the vertical axis, and the angular speed thereof.

That is, the pitch angle $\theta_p$ and the roll angle $\theta_r$ of the upper body relative to the roll ($\theta$x) axis and the pitch ($\theta$y) axis, respectively, are sensed and the pitch angular speed d$\theta_p$/dt and the roll angular speed d$\theta_r$/dt of the upper body are also sensed.

Next, the pitch compensation angle $\theta_{pc}$ is calculated using the pitch angle $\theta_p$ and the pitch angular speed d$\theta_p$/dt and the roll compensation angle $\theta_{rc}$ is calculated using the roll angle $\theta_r$ and the roll angular speed d$\theta_p$/dt.

At this time, the pitch compensation angle $\theta_{pc}$ and the roll compensation angle $\theta_{rc}$ are calculated using the PD control (440) as follows.

$$\theta_{pc}=k_{p1}(\theta_{dp}-\theta_p)+k_{d1}(d\theta_{dp}/dt-d\theta_p/dt) \quad \text{Equation 1}$$

$$\theta_{rc}=k_{p2}(\theta_{dr}-\theta_r)+k_{d2}(d\theta_{dr}/dt-d\theta_r/dt) \quad \text{Equation 2}$$

Next, the torques necessary for driving the joint portions in order to follow the desired positions are calculated. The torque calculator 360 uses the PD control when calculating the torques to be applied to the joint portions.

At this time, it is determined whether the compensation angle is applied, according to the pitch angle and the roll angle of the upper body.

That is, if the pitch compensation angle is the stable angle ($\theta_p$≤a1 or $\theta_p$≤a3) and the roll compensation angle is the stable angle ($\theta_r$≤b1 or $\theta_r$≤b3), the torques to be applied to the joint portions 210 and 230 are calculated using Equations 3 and 4 (440) without applying the compensation angle to the torque calculation equation.

$$T_p=k_{p3}(\theta_d-\theta_c)+k_{d3}(d\theta_d/dt-d\theta_c/dt) \quad \text{Equation 3}$$

$$T_r=k_{p3}(\theta_d-\theta_c)+k_{d3}(d\theta_d/dt-d\theta_c/dt) \quad \text{Equation 4}$$

where, $k_{p3}$ denotes P gain of PD control, $k_{d3}$ denotes D gain of PD control, $\theta_d$ denotes a desired position of the next state of the joint portion, and $\theta_c$ denotes the position of the current state of the joint portion. The P and D gains enable the robot to stably walk and are acquired through experimentation.

In contrast, if at least one of the pitch compensation angle and the roll compensation angle is not the stable angle, that is, $\theta_p$>a1 or $\theta_p$>a3 or $\theta_r$>b1 or $\theta_1$>b3, the pitch torque and the roll torque are calculated (450) by applying the pitch compensation angle and the roll compensation angle to the torque calculation equation to calculate the torques to be applied to the joint portions 210 and 230. These equations are expressed as follows.

$$T_p=k_{p3}(\theta_d-\theta_c\pm\theta_{pc})+k_{d3}(d\theta_d/dt-d\theta_c/dt\pm\theta_{pc}/dt) \quad \text{Equation 5}$$

$$T_r=k_{p3}(\theta_d-\theta_c\pm\theta_{rc})+k_{d3}(d\theta_d/dt-d\theta_c/dt\pm\theta_{rc}/dt) \quad \text{Equation 6}$$

The sign ± of the compensation angle and the angular speed applied to the torque calculation equation becomes + if the upper body is inclined in the same direction as the walking direction of the robot and becomes − if the upper body is inclined in the direction opposite to the walking direction of the robot or becomes + if the upper body is inclined in the same lateral direction of the swing foot in the left and right direction of the swing foot and becomes − if the upper body is inclined in the lateral direction opposite to the direction of the swing foot.

The joint portion, the position trajectory of which will be controlled, is determined according to the pitch angle and the roll angle of the upper body, and the pitch compensation angle and the roll compensation angle are applied to the torque calculation equation to be applied to the determined joint portion, thereby calculating the torque.

Figure 8:
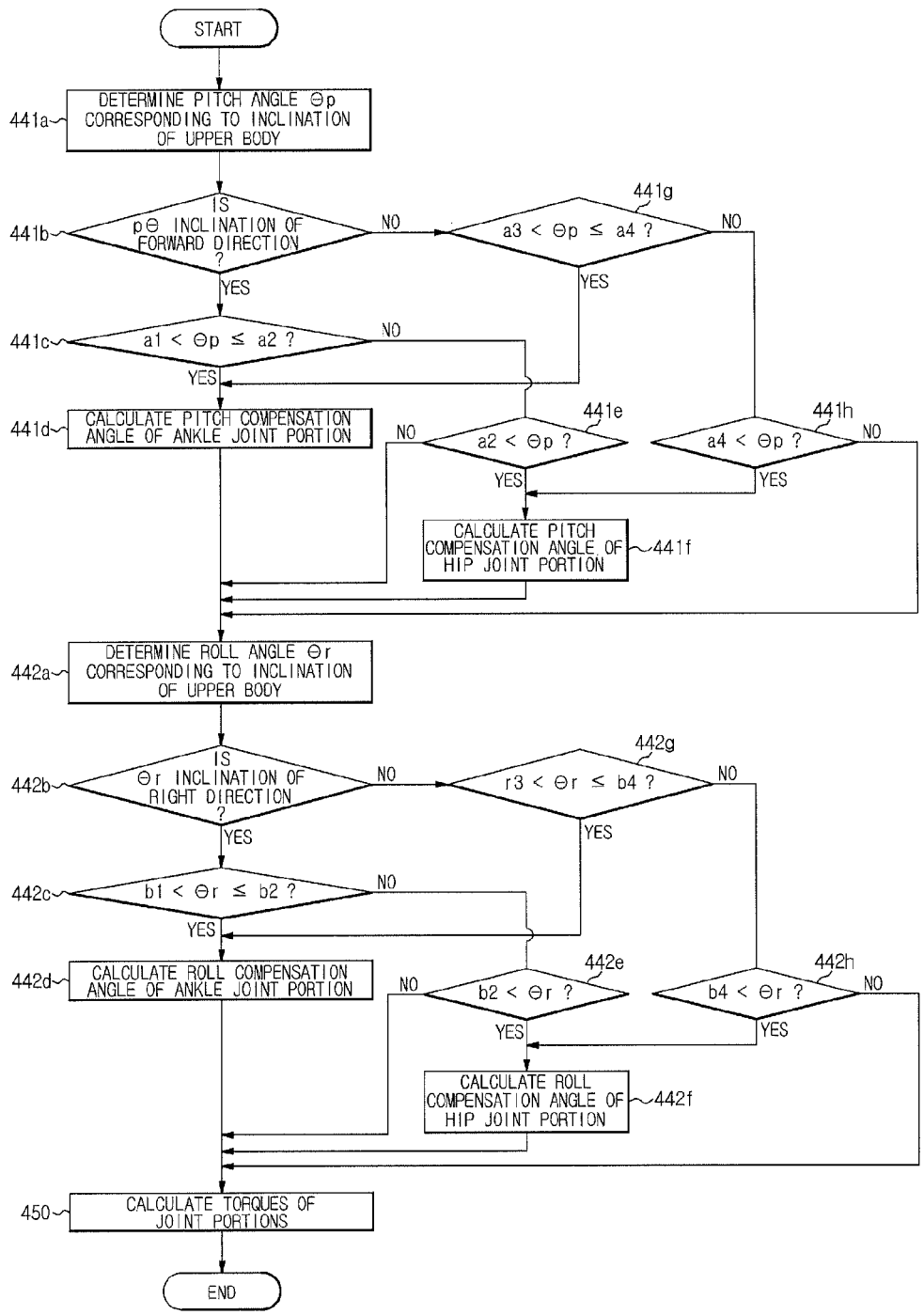
FIG. 8 illustrates detailing a walking control method of a robot according to an embodiment.

Next, the PWM signals are controlled to correspond to the calculated torques and are output to the joint portions, thereby driving the joint portions (460). This will be described in detail with reference to FIG. 8.

First, the inclination of the upper body is analyzed to determine whether the upper body is inclined forward or backward and to determine whether the upper body is inclined in the left direction or the right direction.

At this time, the directions of the pitch angle and the roll angle are determined according to the coordinate of the inclination of the upper body, that is, the signs of the X axis and the Y axis.

By referring to the coordinate axis of FIG. 2, it is determined that the upper body is inclined in a forward direction if the coordinate sign of the X axis is +, it is determined that the upper body is inclined in a backward direction if the coordinate sign of the X axis is −, it is determined that the upper body is inclined in a right direction if the coordinate sign of the Y axis is +, and it is determined that the upper body is inclined in a left direction if the coordinate sign of the Y axis is −.

That is, the pitch angle of the upper body is determined (441a) and determination as to whether the pitch angle of the upper body is the pitch angle of the forward direction or the backward direction is performed (441b).

Next, if the pitch angle of the upper body is the pitch angle of the forward direction, the pitch angle of the upper body is compared with the first reference pitch angle a1 and the second reference pitch angle a2.

At this time, if the pitch angle of the upper body exceeds the first reference pitch angle and is equal to or less than the second reference pitch angle (441c), the pitch compensation angle to compensate for the desired position of the ankle joint portion 230 is calculated (441d), and the calculated pitch compensation angle is applied when calculating the torque, thereby calculating the pitch torque to be applied to the ankle joint portion 230 (450). At this time, the pitch compensation angle performs (+) compensation for the desired position of the ankle joint portion.

If the pitch angle of the upper body exceeds the second reference pitch angle (441e), the pitch compensation angle to compensate for the desired position of the hip joint portion 210 is calculated (441f), and the calculated pitch compensation angle is applied when calculating the torque, thereby calculating the pitch torque to be applied to the hip joint portion 210 (450). At this time, the pitch compensation angle performs (+) compensation for the desired position of the hip joint portion.

In addition, if the pitch angle of the upper body is the pitch angle of the backward direction, the pitch angle of the upper body is compared with the third reference pitch angle and the fourth reference pitch angle.

At this time, if the pitch angle of the upper body exceeds the third reference pitch angle and is equal to or less than the fourth reference pitch angle (441g), the pitch compensation angle to compensate for the desired position of the ankle joint portion 230 is calculated (441d), and the calculated pitch compensation angle is applied when calculating the torque, thereby calculating the pitch torque to be applied to the ankle joint portion 230 (450). At this time, the pitch compensation angle performs (−) compensation for the desired position of the ankle joint portion.

If the pitch angle of the upper body exceeds the fourth reference pitch angle (441h), the pitch compensation angle to compensate for the desired position of the hip joint portion 210 is calculated (441f), and the calculated pitch compensation angle is applied when calculating the torque, thereby calculating the pitch torque to be applied to the hip joint portion 210 (450). At this time, the pitch compensation angle performs (−) compensation for the desired position of the hip joint portion.

That is, if the upper body is inclined forward while walking, the pitch of the ankle joint portion of a swing leg is compensated for by the compensation angle such that the foot is put down in the forward direction and, if the upper body is inclined backward, the pitch of the ankle joint portion is compensated for by the compensation angle such that the foot is put down in the backward direction, thereby maintaining balance.

If the upper body is largely inclined forward, the pitch of the hip joint portion of the swing leg is compensated forward by the compensation angle such that the leg is further extended forward and, if the upper is largely inclined backward, the pitch of the hip joint portion of the swing leg is compensated by the compensation angle such that the leg is slightly stretched forward, thereby maintaining the balance of the robot.

Next, the roll angle of the upper body is determined (442a) and determination as to whether the roll angle of the upper body is the roll angle of the right direction or the left direction is performed (442b).

Next, if the roll angle of the upper body is the roll angle of the right direction, the roll angle of the upper body is compared with the first reference roll angle b1 and the second reference roll angle b2.

Next, if the roll angle of the upper body exceeds the first reference roll angle and is equal to or less than the second reference roll angle (442c), the roll compensation angle to compensate for the desired position of the ankle joint portion 230 is calculated (442d), and the calculated roll compensation angle is applied when calculating the torque, thereby calculating the roll torque to be applied to the ankle joint portion 230 (450).

At this time, if the direction of the roll angle is equal to the direction of the swing foot, (+) compensation for the desired position of the ankle joint portion is performed, and, if the direction of the roll angle is different from the direction of the swing foot, (−) compensation for the desired position of the ankle joint portion is performed.

If the roll angle of the upper body exceeds the second reference roll angle (442e), the roll compensation angle to compensate for the desired position of the hip joint portion 210 is calculated (442f), and the calculated roll compensation angle is applied when calculating the torque, thereby calculating the roll torque to be applied to the hip joint portion 210 (450).

At this time, if the direction of the roll angle is equal to the direction of the swing foot, (+) compensation for the desired position of the hip joint portion is performed, and, if the direction of the roll angle is different from the direction of the swing foot, (−) compensation for the desired position of the hip joint portion is performed.

If the roll angle of the upper body is the roll angle of the left direction, the roll angle of the upper body is compared with the third reference roll angle b3 and the fourth reference roll angle b4.

At this time, if the roll angle of the upper body exceeds the third reference roll angle and is equal to or less than the fourth reference roll angle (442g), the roll compensation angle to compensate for the desired position of the ankle joint portion 230 is calculated (442d), and the calculated roll compensation angle is applied when calculating the torque, thereby calculating the roll torque to be applied to the ankle joint portion 230 (450).

If the roll angle of the upper body exceeds the fourth reference roll angle (442h), the roll compensation angle to compensate for the desired position of the hip joint portion 210 is calculated (442f), and the calculated roll compensation angle is applied when calculating the torque, thereby calculating the roll torque to be applied to the hip joint portion 210 (450).

That is, if the upper body is inclined in the right direction, the roll of the ankle joint portion of the swing leg is compensated for by the compensation angle such that the foot is put down in the right direction and, if the upper body is inclined in the left direction, the roll of the ankle joint portion is compensated for by the compensation angle such that the foot is put down in the left direction, thereby maintaining balance.

If the upper body is largely inclined in the right direction, the roll of the hip joint portion of the swing leg is compensated for by the compensation angle in the right direction such that the leg is further extended and, if the upper is largely inclined in the left direction, the roll of the hip joint portion of the swing leg is compensated by the compensation angle in the left direction such that the leg is extended, thereby maintaining balance.

The inclination of the upper body is sensed with respect to each of the predetermined states of the two legs and the sensed inclination is compensated for to generate the torque to maintain the balance of the robot by a combination of FSM walking control and torque servo control.

By controlling the driving of the joint portion corresponding to the state of each leg without accurately controlling the rotation angle of each joint while walking, the robot walks with low servo gain. Accordingly, energy consumption is reduced.

In addition, since the robot walks with low servo gain, the rigidity of each joint portion is decreased. Thus, shock generated when colliding with surroundings is decreased.

Since the robot walks while extending its knee, energy necessary for bending the knee of the robot is conserved.

Since the compensation angle is calculated based on the inclination of the upper body, the method is simple and is applicable to a robot having joints with six degrees of freedom.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A walking control apparatus of a robot comprising:
   joint portions provided in each of a plurality of legs of the robot;
   a state database to store state data of each of the legs and state data of the joint portions corresponding to the state of each of the legs, when the robot walks, the state data of the legs and the joint portions based on Finite State Machine (FSM);
   a position instruction unit to generate desired positions corresponding to the state data of the joint portions;
   an inclination sensing unit to sense an inclination of an upper body of the robot;
   a compensator to calculate compensation angles for the joint portions using the sensed inclination of the upper body;
   a torque calculator to determine whether the compensation angles are applied according to the magnitude of the inclination of the upper body, to calculate torques using the desired positions and the calculated compensation angles when it is determined that the compensation angles are applied; and
   a servo controller to output the torques to the joint portions to control the walking of the robot.

2. The walking control apparatus according to claim 1, wherein the torque calculator calculates the torques using the desired positions and the compensation angles if the position instruction unit transmits desired position instruction signals of a next state.

3. The walking control apparatus according to claim 2, wherein:
   the inclination sensing unit senses a pitch angle and a roll angle corresponding to the inclination of the upper body, and
   the compensator calculates a pitch compensation angle using the pitch angle of the upper body and calculates a roll compensation angle using the roll angle of the upper body.

4. The walking control apparatus according to claim 1, wherein the joint portions include a hip joint portion to move a thighbone portion of the robot and an ankle joint portion to move a foot.

5. The walking control apparatus according to claim 4, wherein the torque calculator analyzes the pitch angle and the roll angle of the upper body and determines a direction of the pitch angle and a direction of the roll angle.

6. The walking control apparatus according to claim 5, wherein the torque calculator compares the pitch angle of the upper body with a first reference pitch angle and a second reference pitch angle to calculate the pitch torque of any one of the ankle joint portion or the hip joint portion, if the pitch angle of the upper body is a pitch angle of a forward direction.

7. The walking control apparatus according to claim 5, wherein the torque calculator compares the pitch angle of the upper body with a third reference pitch angle and a fourth reference pitch angle to calculate the pitch torque of any one of the ankle joint portion or the hip joint portion, if the pitch angle of the upper body is a pitch angle of a backward direction.

8. The walking control apparatus according to claim 5, wherein the torque calculator compares the roll angle of the upper body with a first reference roll angle and a second reference roll angle to calculate the roll torque of any one of the ankle joint portion or the hip joint portion, if the roll angle of the upper body is a roll angle of a right direction.

9. The walking control apparatus according to claim 5, wherein the torque calculator compares the roll angle of the upper body with a third reference roll angle and a fourth reference roll angle to calculate the roll torque of any one of the ankle joint portion or the hip joint portion, if the roll angle of the upper body is a roll angle of a left direction.

10. A walking control method of a robot comprising:
    outputting instructions of desired positions corresponding to state data of joint portions provided in the robot, the state data of the legs and the joint portions based on Finite State Machine (FSM);
    sensing an inclination of an upper body of the robot;
    calculating compensation angles for the joint portions using the sensed inclination of the upper body;
    determining whether the compensation angles are applied according to the magnitude of the inclination of the upper body;
    calculating torques using the desired positions and the calculated compensation angles when it is determined that the compensation angles are applied; and
    outputting the calculated torques to the joint portions to control the walking of the robot.

11. The walking control method according to claim 10, wherein the sensing of the inclination of the upper body of the robot includes sensing a pitch angle and a roll angle corresponding to the inclination of the upper body.

12. The walking control method according to claim 11, wherein the calculating of the compensation angles includes calculating a pitch compensation angle using the pitch angle of the upper body and calculating a roll compensation angle using the roll angle of the upper body.

13. The walking control method according to claim 12, wherein the outputting of the calculated torques to the joint portions includes outputting the torques to at least one of a hip joint portion to move a thighbone portion of the robot and an ankle joint portion to move a foot of the robot.

14. The walking control method according to claim 11, wherein the calculating of the torques includes determining a direction of the pitch angle of the upper body and a direction of the roll angle of the upper body by analyzing the pitch angle and the roll angle.

15. The walking control method according to claim 14, wherein the calculating of the torques includes:
    comparing the pitch angle of the upper body with a first reference pitch angle and a second reference pitch angle if the pitch angle of the upper body is a pitch angle of a forward direction;
    calculating pitch torque of the ankle joint portion using the pitch compensation angle if the pitch angle of the upper body exceeds the first reference pitch angle and is equal to or less than the second reference pitch angle; and
    calculating the pitch torque of the hip joint portion using the pitch compensation angle if the pitch angle of the upper body exceeds the second reference pitch angle.

16. The walking control method according to claim 14, wherein the calculating of the torques includes:
    comparing the pitch angle of the upper body with a third reference pitch angle and a fourth reference pitch angle if the pitch angle of the upper body is a pitch angle of a backward direction;
    calculating pitch torque of the ankle joint portion using the pitch compensation angle if the pitch angle of the upper body exceeds the third reference pitch angle and is equal to or less than the fourth reference pitch angle; and
    calculating the pitch torque of the hip joint portion using the pitch compensation angle if the pitch angle of the upper body exceeds the fourth reference pitch angle.

17. The walking control method according to claim 14, wherein the calculating of the torques includes:
    comparing the roll angle of the upper body with a first reference roll angle and a second reference roll angle if the roll angle of the upper body is a roll angle of a right direction;
    calculating roll torque of the ankle joint portion using the roll compensation angle if the roll angle of the upper body exceeds the first reference roll angle and is equal to or less than the second reference roll angle; and
    calculating the roll torque of the hip joint portion using the roll compensation angle if the roll angle of the upper body exceeds the second reference roll angle.

18. The walking control method according to claim 14, wherein the calculating of the torques includes:
    comparing the roll angle of the upper body with a third reference roll angle and a fourth reference roll angle if the roll angle of the upper body is a roll angle of a left direction;
    calculating roll torque of the ankle joint portion using the roll compensation angle if the roll angle of the upper body exceeds the third reference roll angle and is equal to or less than the fourth reference roll angle; and
    calculating the roll torque of the hip joint portion using the roll compensation angle if the roll angle of the upper body exceeds the fourth reference roll angle.

19. The walking control method according to claim 10, wherein the outputting of the instructions of the desired positions includes comparing desired positions of a next state and positions of a current state of the joint portions to generate position instruction signals and outputting the generated position instruction signals.

20. The walking control method according to claim 19, wherein the calculating of the torques includes:
    compensating for the generated position instruction signals using the inclination of the upper body; and
    calculating the torques to follow the compensated position instruction signals.

* * * * *

UNITED STATES PATENT AND TRADEMARK OFFICE
CERTIFICATE OF CORRECTION

PATENT NO. : 8,868,239 B2
APPLICATION NO. : 12/984820
DATED : October 21, 2014
INVENTOR(S) : Min Hyung Lee et al.

Page 1 of 1

It is certified that error appears in the above-identified patent and that said Letters Patent is hereby corrected as shown below:

On the Title Page

Column 1, Item [75] (Inventors), line 4, delete "Suweon-si (KR)" and insert -- Suwon-si (KR) --, therefor.

In the Claims

Column 17, line 12, in Claim 10, delete "of the legs and" and insert -- of --, therefor.

Signed and Sealed this
Nineteenth Day of May, 2015

Michelle K. Lee
*Director of the United States Patent and Trademark Office*